United States Patent [19]

Van Acker et al.

[11] 4,195,004

[45] Mar. 25, 1980

[54] PROCESS FOR PREPARING WATER-DISPERSIBLE RESINS

[75] Inventors: Eduard M. A. A. J. Van Acker; Petrus G. Kooijmans; Aart de Heer, all of Amsterdam, Netherlands

[73] Assignee: Shell Oil Company, Houston, Tex.

[21] Appl. No.: 962,593

[22] Filed: Nov. 21, 1978

[51] Int. Cl.² .............................................. C08L 33/14
[52] U.S. Cl. ........................... 260/29.6 TA; 526/320; 525/329; 525/384; 525/386
[58] Field of Search ..................... 526/16, 54, 56, 320; 260/29.6 AT, 29.6 TA

[56] References Cited

FOREIGN PATENT DOCUMENTS 1418372 12/1975 United Kingdom.

*Primary Examiner*—Paul R. Michl
*Attorney, Agent, or Firm*—Norris E. Faringer

[57] ABSTRACT

The invention relates to the preparation of hydroxyl- and carboxyl-containing resins for aqueous paint dispersions which are prepared by reacting a copolymer component (A) prepared from vinyl esters of alpha-branched acids, styrene or vinyl toluene, hydroxyalkyl ester and alkyl of alpha-beta ethylenically unsaturated acid, with (B) a substantially 1:1 molar reaction product of trimellitic anhydride and glycidyl esters of alpha-branched acids.

9 Claims, No Drawings

PROCESS FOR PREPARING WATER-DISPERSIBLE RESINS

BACKGROUND OF THE INVENTION

The advantages of water as a diluent for surface coatings is well known, as for example, such a diluent is both nonflamable and relatively inexpensive.

The use of water does require; however, an adaptation of the customary binders. Widely used surface-coating compositions are those containing a binder that is made soluble in water. Carboxyl groups are usually incorporated into a binder to an acid number higher than 30, which are then completely or partly neutralized with a base. Since many binders are polymeric substances, the high viscosity of these solutions sometimes presents difficulties, especially when a high concentration is required. Another difficulty is the long drying time that is often required before the surface coating can be enamelled. If water is still present in the surface coating when the enamelling step is performed, blistering of the surface coating may result.

Aqueous dispersions in which the binder is dispersed in water instead of dissolved, have as advantages that higher binder concentrations can be used without viscosity problems, and that it is easier to evaporate the water from the surface coating than from a solution; a drawback is usually that surface-active substances or dispersants have to be used for making the dispersion, and for giving it a sufficient stability. Such surface-active substances or dispersants generally have an unfavorable effect on the properties of the hardened surface coating; in particular, they increase the water sensitivity.

A process has now been found for preparing resins that are dispersible in water without using surface-active substances or dispersants.

SUMMARY OF THE INVENTION

The invention is defined as a process for the preparation of a hydroxyl- and carboxyl-containing resin, dispersible in water with the aid of a base, characterized in that 100 parts by weight (pbw) of a copolymer component (A) prepared from (a) 10–60 pbw of a vinyl ester of saturated aliphatic monocarboxylic acids in which the carboxyl group is bound to a tertiary or quaternary carbon atom, (b) 10–15 pbw styrene or vinyl toluene, (c) 5–25 pbw hydroxyalkyl ester of an alpha-beta ethylenically unsaturated monocarboxylic acid, and (d) 0–40 pbw butyl ester of an alpha, beta-ethylenically unsaturated monocarboxylic acid, all these constituents per 100 pbw copolymer, are reacted with 5 to 25 pbw of a component (B) prepared by reacting trimellitic anhydride and a glycidyl ester of saturated aliphatic monocarboxylic acids in which the carboxyl group is bound to a tertiary or quaternary carbon atom in molecular ratios from about 0.8:1 to 1:1.2.

DESCRIPTION OF THE PREFERRED EMBODIMENTS

In the preferred process, component (A) is a copolymer prepared from
(a) 30–40 parts by weight of a vinyl ester of saturated aliphatic monocarboxylic acids in which the carboxyl group is attached to a tertiary or quaternary carbon atom,
(b) 20–30 parts by weight of styrene or vinyl toluene,
(c) 10–20 parts by weight of a hydroxyalkyl ester of an alpha-beta ethylenically unsaturated monocarboxylic acid, and
(d) 10–20 parts by weight of an alkyl ester of an alpha-beta ethylenically unsaturated carboxylic acid,
all these constituents per 100 parts by weight of copolymer.

The saturated aliphatic monocarboxylic acids utilized in the present compositions may be represented by the general formula:

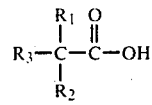

wherein $R_1$ and $R_2$ each represent the same or different alkyl radicals of normal, branched or cyclic structure and $R_3$ represents hydrogen or a hydrocarbyl radical. In the foregoing, formula $R_1$ and $R_2$ each may represent a methyl, ethyl, propyl, butyl, pentyl, octyl, decyl, and the like, radicals. Hydrocarbyl radicals may comprise, for example, alkyl radicals of normal, branched, or cyclic structure, including methyl, ethyl, propyl, butyl, pentyl, hexyl, octyl, as well as alkaryl, aralkyl and aryl radicals. Suitable such monocarboxylic acids are those having from about 4 to about 20 carbon atoms in the molecular, with from about 9 to 19 being preferred, and from about 9 to 11 being especially preferred. A very suitable alpha-branched, saturated, aliphatic monocarboxylic acid has 10 carbon atoms in the molecule. The preparation of these branched monocarboxylic acids is well known. See, for example, U.S. Pat. Nos. 3,047,662; 3,059,005; and 3,059,006.

These alpha-branched monocarboxylic acids may be converted to their respective vinyl esters by well known techniques such as those described in U.S. Pat. No. 3,186,974.

These alpha-branched monocarboxylic acids may also be converted to their respective glycidyl esters by well known techniques such as those described in U.S. Pat. No. 3,249,653.

The hydroxyester of an alpha, beta-ethylenically unsaturated monocarboxylic acid (component (A) (c)) is preferably a 2-hydroxy $C_2$ or $C_3$ alkyl ester of a $C_3$ or $C_3$ ethylenically unsaturated acid, and preferably hydroxyethyl methacrylate, hydroxyethyl acrylate, 2-hydroxypropyl acrylate, or 2-hydroxypropyl methacrylate. This component gives hydroxyl functionality for three purposes: conversion with component (B) for incorporating carboxyl functionality, contribution to the hydrophylic balance, which is important for the dispersibility in water, and provision of active groups for "cross-linking" during enamelling.

The styrene or vinyl toluene contributes to the good chemical resistance as well as other functions in the copolymerization with the vinyl esters as described in detail in British Pat. No. 1,418,372.

Component (A) (d) contains preferably a $C_1$ to $C_{10}$ alkyl group, and is more preferably derived from a $C_3$ or $C_4$ monocarboxylic acid; $C_4$ to $C_{10}$ alkyl groups are preferred to improve the flexibility of the cured coating; examples are butyl acrylate and 2-ethyl hexyl acrylate.

Copolymers as mentioned under (A) are preferably prepared according to the process described in British Pat. No. 1,418,372. According to this process such vinyl esters of branched monocarboxylic acids are copolymerized in mass with styrene and other monomers at temperatures above 150° C.

Component (B) is a product prepared by causing trimellitic anhydride and glycidyl esters of branched monocarboxylic acids to react in molecular ratios from 0.8:1 to 1:1.2 at temperatures up to 150° C. This reaction can be carried out in a solvent, for instance, methyl ethyl ketone, in which case the reaction temperature is preferably kept below 100° C., or it is possible to work without a solvent and then temperatures from 80° to 150° C. are preferred.

Trimellitic anhydride is a solid with a rather high melting point (168° C.). Under exothermic reaction it dissolves rapidly in the glycidyl esters mentioned. The reaction product has a low melting point and dissolves readily and completely in the polymeric component (A).

Component (B) is an acid polyester, preferably formed by addition of epoxy groups to carboxyl groups, and half-ester formation of the hydroxyl groups with anhydride groups. Although the exact mechanism of the reaction of component (B) with component (A) is not known, such a component (B) reacts as a cyclic carboxylic anhydride.

Probably, the half-ester groups in component (B) decompose above 100° C. partly into anhydride groups of OH groups (a well-known phenomenon for half esters) and the anhydride groups preferably react then with the OH groups of component (A), which are present in excess.

Per 100 parts by weight (pbw) of component (A) it is preferred to take 10–20 pbw of component (B) and these components are caused to react preferably at temperatures between 100° and 150° C. With less than 5 pbw of component (B) per 100 pbw of component (A) the dispersibility in water becomes poor; with more than 25 pbw of component (B) per 100 pbw of component (A) a resin is obtained, which after neutralization, becomes water-soluble. A strict dividing line between solubility and dispersibility cannot be drawn.

Dispersibility in water is attained by neutralizing the resin thus obtained with 70–125% of the theoretically required quantity of a base, preferably ammonia or an amine. For a good dispersibility and stability of the dispersion the quantity of base is set to such a level that the pH of the dispersion is 7–8, preferably 7.5. Neutralizing is preferably effected at elevated temperature with vigorous stirring. In this way concentrated aqueous resin dispersions can be made, which may, if desired, be diluted further with water. Such resin dispersions can be processed further into paints and lacquers by adding pigments, extenders and other auxiliary materials for paints, such as "cross-linking" resins (urea resins, melamine resins, phenolic resins), for instance in ratios from 90/10 to 70/30. Such resin dispersions have a good storage stability. It is also possible to add small amounts of organic solvents, for example, in order to modify spraying properties. The dispersions and the paints prepared from them can be applied to objects by the conventional techniques, such as by a brush or a roller, by spraying or immersion or by electrolytic deposition by means of a direct current on a metal object connected as an anode.

After drying, the paint layers can be enamelled at the usual temperatures, such as 120°–150° C.; the enamelled surface coatings have a good bond strength, gloss, hardness, flexibility and resistance to weather and chemicals. The present dispersions may, for example, be used for applying one-layer systems for all kinds of purposes, or for applying top coats to car bodies.

The invention will be illustrated with reference to the following examples. It will be appreciated that the following examples are for the purpose of illustration only and is in no way intended to limit the invention to the particular compositions illustrated. Modifications within the spirit and scope of the present invention will become apparent to those skilled in the coatings art.

Parts and percentages therein are parts by weight and percentages by weight, respectively, unless stated otherwise.

The vinyl and glycidyl esters of branched acids mentioned below are vinyl and glycidyl esters, respectively, of saturated aliphatic monocarboxylic acids in which the carboxyl group is bound to a tertiary or quaternary carbon atom and which carboxylic acids contain 10 carbon atoms per molecule. Both kinds of ester are liquid at room temperature.

"Initiator B" is di-tert-butyl peroxide.

The glycidyl ester had an epoxy equivalent weight of 246.

EXAMPLE 1

Preparation of component (A)

Thirty-five parts by weight (pbw) of the vinyl ester of branched acids are introduced into a reactor equipped with stirrer, heating jacket and cooling device. The temperature is brought to 170° C. A mixture of 28 pbw styrene, 17 pbw hydroxyethyl methacrylate, 16 pbw butyl acrylate and 2 pbw "Initiator B" is then gradually added in 5 hours' time, while the temperature is maintained at 170° C. The product is kept at 170° C. for a further 40 minutes and then cooled to 135° C.

Preparation of component (B)

Glycidyl ester of branched acids (1.04 mol) andc trimellitic anhydride (1.0 mol; anhydride content 95–96% w; the rest is trimellitic acid) are introduced in the form of chips or powder into a reactor equipped with stirrer, heating jacket, and cooling device. This mixture is gently heated to 80° C., at which temperature an exothermic reaction starts. The temperature is then allowed to rise to at most 130° C. with stirring and, if necessary, with cooling. When the heat development stops after about 15 minutes' time, heating is continued at 140° C. for 30 minutes, benzyldimethylamine (0.025 mol) is added as a catalyst, and heating is continued for a further 30 minutes at 140°–145° C. The product is then poured out on plates.

It is not necessary to pass air on nitrogen through the reaction mixture, and stirring should be done gently.

A product thus prepared in various batches had the following properties:

| | |
|---|---|
| Total acid content (acid + anhydride) | 230–240 meq./100 g |
| Anhydride | 15–25 meq./100 g |
| Epoxy content | <3 meq./100 g |

Reaction of components (A) and (B)

To the reactor containing the above-mentioned quantity of component (A) 15 pbw of component (B) are added, and the temperature is maintained at 135° C. for 30 minutes with stirring. Then the resin is cooled, for example, by pouring out on plates. The product is a clear, almost colorless, glassy resin having the following properties:

| | |
|---|---|
| $M_n$ | 2500 |
| $M_w$ | 50000 |
| $T_g$ | 273 K |
| OH content | 135 meq/100 g |
| Acid content | 26 meq/100 g |
| Free vinyl ester content | <1% w |

Dispersion in water

Into a reactor equipped with a powerful impeller, a heating jacket and a cooling device, 1000 pbw of the above-mentioned resin are introduced. After heating to 90° C. a solution of 17.4 parts of 25%ammonia (0.255 mol) in 232.6 g demineralized water is added with vigorous stirring in 30 minutes' time. Another 750 pbw of demineralized water are added then, and, if necessary, the pH is brought to 7.5. This dispersion contains 50%w resin and is stable at room temperature.

Preparation of a paint

In a ball mill the following mixture is ground:

| | |
|---|---|
| the above-mentioned resin dispersion | 645.3 pbw |
| hexamethoxymethylmelamine resin | 56.8 pbw |
| titanium dioxide pigment | 265.6 pbw |
| demineralized water | 32.3 pbw |

In this paint the weight ratio of the two types of resin is 85/15, and the pigment/binder ratio 0.7/1.0; the pH is 7.5 and the solids content 64.5%w. The paint was diluted with demineralized water to a solids content of 62%w to obtain a spray viscosity of 17 seconds Ford 4 cup.

Evaluation of the paint

The paint was sprayed on steel panels, both bonderized ones and panels which had only been degreased. These panels were enamelled for 20 minutes at 150° C. The paint films had the following properties:

| | bonderized | degreased |
|---|---|---|
| Hardness (König) | 150 | 150 |
| Gloss (Lange 45°/45°) | 90–95% | 90–95% |
| Adhesion (Gitterschnitt) | Gt 0 | Gt 0 |
| Erichsen slow penetration | >7.5 mm | >7.5 mm |
| Erichsen impact resistance, direct | 3 mm | 3 mm |
| reverse | 3 mm | 3 mm |
| Ford impact resistance, direct | 28 cmkg | 13.5 cmkg |
| reverse | 5.6 cmkg | 6.75 cmkg |
| Resistance to 0.5% detergent, 80° C. | | |
| after 24 hours | ++ | blistering 2–3 M |
| after 48 hours | +a | — |
| Salt spray (200 h) | <1 mm subsurface rust:+ | |

++ :no loss of gloss, decoloration or blistering.
+ :no blistering or loss of gloss.
a:film becomes somewhat soft, but is hard again after 1 hour.
— :total loss of adhesion.

A similar paint was prepared with a more reactive melamine resin (Resimene" 2720); films thereof had a solvent resistance of 10–15 minutes.

EXAMPLE 2

Example 1 was repeated, with the difference that amounts of constituents for component (A) were as follows:

| | |
|---|---|
| vinyl ester | 20 pbw |
| styrene | 35 pbw |
| hydroxyethyl methacrylate | 15 pbw |
| butyl acrylate | 28 pbw |

The reaction product of components (A) and (B) had

| | |
|---|---|
| $\overline{M}_n$ | 3500 |
| $T_g$ | 278 K |
| free vinylester | 0.5% w |

A paint composition and evaluation as in Example 1 had nearly identical evaluation results: on bonderized panels the hardness (König) was 165, the gloss 85–90, the Erichsen slow penetration 7.0 mm, the Ford impact direct 35 cm kg, reverse 6 cm kg, and the salt spray resistance (200 h) 1.5 mm subsurface rust :+.

EXAMPLE 3

Example 1 was repeated with a difference in component (A) as follows:

| | |
|---|---|
| vinyl ester | 25 pbw |
| styrene | 45 pbw |
| hydroxyethyl methacrylate | 15 pbw |
| 2-ethyl hexyl acrylate | 15 pbw |

Reaction product of (A) and (B) had $\overline{M}_n = 3000$, $T_g = 280$K, and free vinyl ester 0.5%w.

Evaluation results: the cured films were slightly harder and less flexible:

Hardness (König) 175, Ford impact resistance direct 20 cm kg, reverse 5 cm kg.

EXAMPLE 4

Example 1 was repeated with a different component (A):

| | |
|---|---|
| vinyl ester | 45 pbw |
| styrene | 25 pbw |
| hydroxyethyl methacrylate | 15 pbw |
| butyl acrylate | 15 pbw |

The reaction product of (A) and (B) had $T_g$ 270 K, and contained 0.95%w of free vinyl ester. The hardness of the cured films (König) was 150, the Ford impact resistance direct 40 cm kg, reverse 10 cm kg, the salt spray resistance (400 h)<1 mm underrust :+.

What we claim is:

1. A process for the preparation of hydroxyl- and carboxyl-containing resins dispersible in water with the aid of a base which comprises reacting 100 parts by weight of a copolymer component (A) prepared by reacting (a) from 10 to 60 parts by weight of a vinyl ester of an alpha-branched, saturated, aliphatic monocarboxylic acid, (b) from 10 to 50 parts by weight of styrene or vinyl toluene, (c) from 5 to 25 parts by weight of a hydroxyalkyl ester of an alpha,beta-ethylenically unsaturated monocarboxylic acid, and (d)

from 0 to 40 parts by weight of an alkyl ester of an alpha,beta-ethylenically unsaturated monocarboxylic acid with about 5 to 25 parts by weight of a component (B) prepared by reacting trimellitic anhydride and a glycidyl ester of alpha-branched, saturated, aliphatic monocarboxylic acids in the mole ratio of from about 0.8:1 to 1:1.2.

2. The process of claim 1 wherein component (A) is a copolymer prepared from (a) 30 to 40 parts by weight of a vinyl ester of alpha-branched, saturated, aliphatic monocarboxylic acids, (b) 20 to 30 parts by weight of styrene or vinyl toluene, (c) 10 to 20 parts by weight of a hydroxyalkyl ester of an alpha-beta-ethylenically-unsaturated monocarboxylic acid, and (d) 10 to 20 parts by weight of an alkyl ester of an alpha-beta-ethylenically unsaturated carboxylic acid, all these constituents per 100 parts by weight of copolymer.

3. The process of claim 1 wherein the alpha-branched, saturated aliphatic monocarboxylic acids of components (A)(a) and (B) contain from 9 to 11 carbon atoms per molecule.

4. The process of claim 1 wherein the component (A) (c) is hydroxyethyl or 2-hydroxypropyl methacrylate.

5. The process of claim 1 wherein component (A) (d) is an alkyl ester of an alpha-beta ethylenically unsaturated monocarboxylic acid containing from 4 to 10 carbon atoms in the alkyl group.

6. The process of claim 5 wherein component (A) (d) is a butyl ester.

7. The process of claim 1 wherein 10 to 20 parts by weight of component (B) per 100 parts by weight of component (A) are utilized.

8. The process of claim 1 wherein the reaction of components (A) and (B) is carried out at temperatures between 100° and 150° C.

9. An aqueous coating dispersion comprising the resin of claim 1 dispersed in an aqueous solution of ammonia.

* * * * *